(12) United States Patent
Hoehn et al.

(10) Patent No.: US 6,694,833 B2
(45) Date of Patent: Feb. 24, 2004

(54) MULTI-SPEED WORM GEAR REDUCTION ASSEMBLY

(75) Inventors: Richard T. Hoehn, Port Austin, MI (US); Barbara P. Boxwell, Midland, MI (US)

(73) Assignee: Drive-All Manufacturing Company, Inc., Harbor Beach, MI (US)

( * ) Notice: Subject to any disclaimer, the term of this patent is extended or adjusted under 35 U.S.C. 154(b) by 0 days.

(21) Appl. No.: 10/454,272

(22) Filed: Jun. 4, 2003

(65) Prior Publication Data

US 2003/0196505 A1 Oct. 23, 2003

Related U.S. Application Data

(62) Division of application No. 09/894,232, filed on Jun. 28, 2001.

(51) Int. Cl.$^7$ .................................................. F16H 3/06
(52) U.S. Cl. .............................. 74/331; 74/333; 74/425
(58) Field of Search .......................... 74/331, 333, 352, 74/362, 366, 373, 363, 369, 425

(56) References Cited

U.S. PATENT DOCUMENTS

| 1,175,251 A | * | 3/1916 | Fleury et al. | 74/425.5 |
| 1,449,482 A | * | 3/1923 | Zuhars et al. | 74/343 |
| 1,469,333 A | | 10/1923 | Ross | |
| 1,485,857 A | * | 3/1924 | Klausmeyer | 74/342 |
| 1,751,770 A | * | 3/1930 | Sweet | 74/344 |
| 1,829,725 A | * | 11/1931 | Alden | 74/342 |
| 2,117,654 A | * | 5/1938 | Cotanch | 74/375 |
| 2,719,442 A | | 10/1955 | O'Leary | |
| 2,811,859 A | * | 11/1957 | Peras | 74/342 |
| 3,208,305 A | * | 9/1965 | Butterbaugh et al. | 74/425 |
| 3,264,893 A | * | 8/1966 | Stott et al. | 74/473.25 |
| 3,520,022 A | * | 7/1970 | Lehner | 74/342 |
| 5,038,633 A | * | 8/1991 | Igarashi et al. | 74/331 |

FOREIGN PATENT DOCUMENTS

| CH | 154 381 | 4/1932 |
| DE | 540 565 | 12/1931 |
| DE | 852 498 | 10/1952 |
| EP | 0 797 025 | 9/1997 |
| GB | 2 074 258 | 10/1988 |

* cited by examiner

Primary Examiner—William C. Joyce
(74) Attorney, Agent, or Firm—Carlson, Gaskey & Olds

(57) ABSTRACT

A gearbox assembly including a housing supporting an input shaft to drive a first shaft that includes drive gears that correspond to driven gears on a second shaft. The driven gears are movable axially along the second shaft by shift levers such that a desired gear ratio can be selected. The second shaft also includes a worm shaft portion that drives a corresponding worm gear disposed on an output shaft. Another embodiment includes an input shaft driving first and second shafts. A third shaft includes two clutch assemblies with driven gears that engage drive gears of the first or second shafts. A gear on the third shaft drives a gear of an output shaft. The clutch assemblies move one of the driven gears into engagement with one of the first and second drive gears to selectively vary the speed of the output shaft.

6 Claims, 5 Drawing Sheets

MULTI-SPEED WORM GEAR REDUCTION ASSEMBLY

This application is a Divisional of currently pending U.S. patent application Ser. No. 09/894,232 filed on Jun. 28, 2001.

BACKGROUND OF THE INVENTION

This invention relates to a worm drive gearbox assembly having a variable speed output shaft.

Typically, worm drive gearbox assemblies are used in industrial machines to step down the shaft speed of the output from a drive motor. The drive motor typically is attached to rotate an input shaft of the gearbox assembly. The input shaft drives an output shaft through a series of gears including a worm gear such that the output shaft rotates at a reduced speed relative to the speed of the input shaft. Often the reduced speed of the output shaft is all that is required to properly accommodate all machine operations. However, in some instances a further gearbox having selectable gearing is attached driven by the output shaft of the worm drive gearbox to provide a variable output required to accommodate desired machine operation at an additional cost.

For this reason there is a need for a worm drive gearbox that can both step down input shaft speed and provide a variable output shaft speed.

SUMMARY OF THE INVENTION

The invention is a worm drive gearbox assembly including multiple drive gears that are selectively engageable to vary the speed of an output shaft.

The gearbox assembly includes an input shaft that is rotated at a first speed by an external power source. The input shaft includes a gear head to drive a first intermediate shaft. The first intermediate shaft includes multiple drive gears. The drive gears correspond to multiple driven gears disposed on a second intermediate shaft. The multiple driven gears are movable axially along the second intermediate shaft by shift levers to selectively engage or disengage specific gear combinations.

In another embodiment of the subject gearbox assembly an input shaft supported by the housing drives first and second intermediate shafts at a common speed. A third intermediate shaft includes two clutch assemblies disposed at opposite ends. The third shaft is transverse to the first and second intermediate shafts. Each of the clutch assemblies includes a driven gear that engages with a drive gear of one of the first and second intermediate shafts. The first intermediate shaft includes a worm gear that engages a worm gear on the third shaft when the corresponding clutch is actuated. The third shaft is driven by actuating one of the clutches to engage one of the first and second intermediate shafts. The speed of the third intermediate shaft depends on which of the intermediate shafts is engaged. The third intermediate shaft includes a final drive gear to drive a final driven gear disposed on the output shaft.

The gearbox assembly of the subject invention provides a worm drive gearbox assembly that provides the shaft speed step down function while providing for selection of various output shaft speeds.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
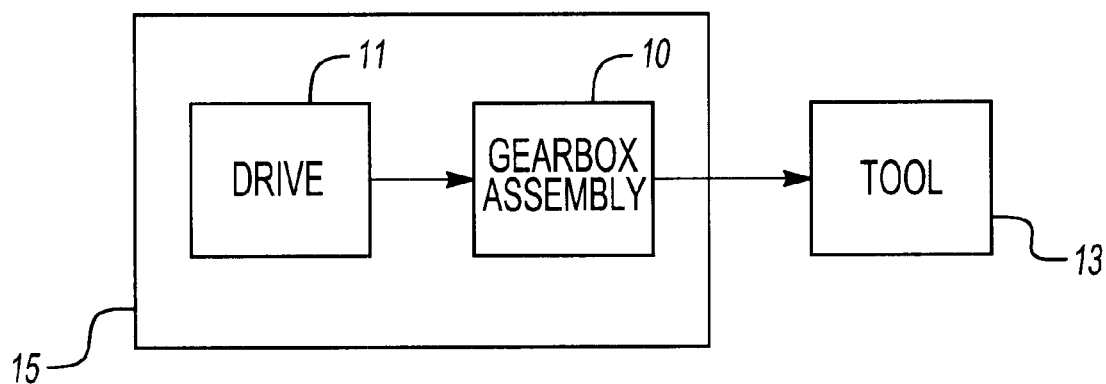
FIG. 1 is a schematic illustration of a machine tool including the gearbox assembly.

Referring to the Figures, wherein like numerals indicate like or corresponding parts throughout the several views, the subject invention is a gearbox assembly shown schematically at 10 in FIG. 1. Preferably the gearbox assembly 10 is part of a machine tool 15. A drive 11 rotates the gearbox assembly 10 which in turn drives a tool 13 of the machine 15. The machine 15 is of any type known in the art.

Figure 2:
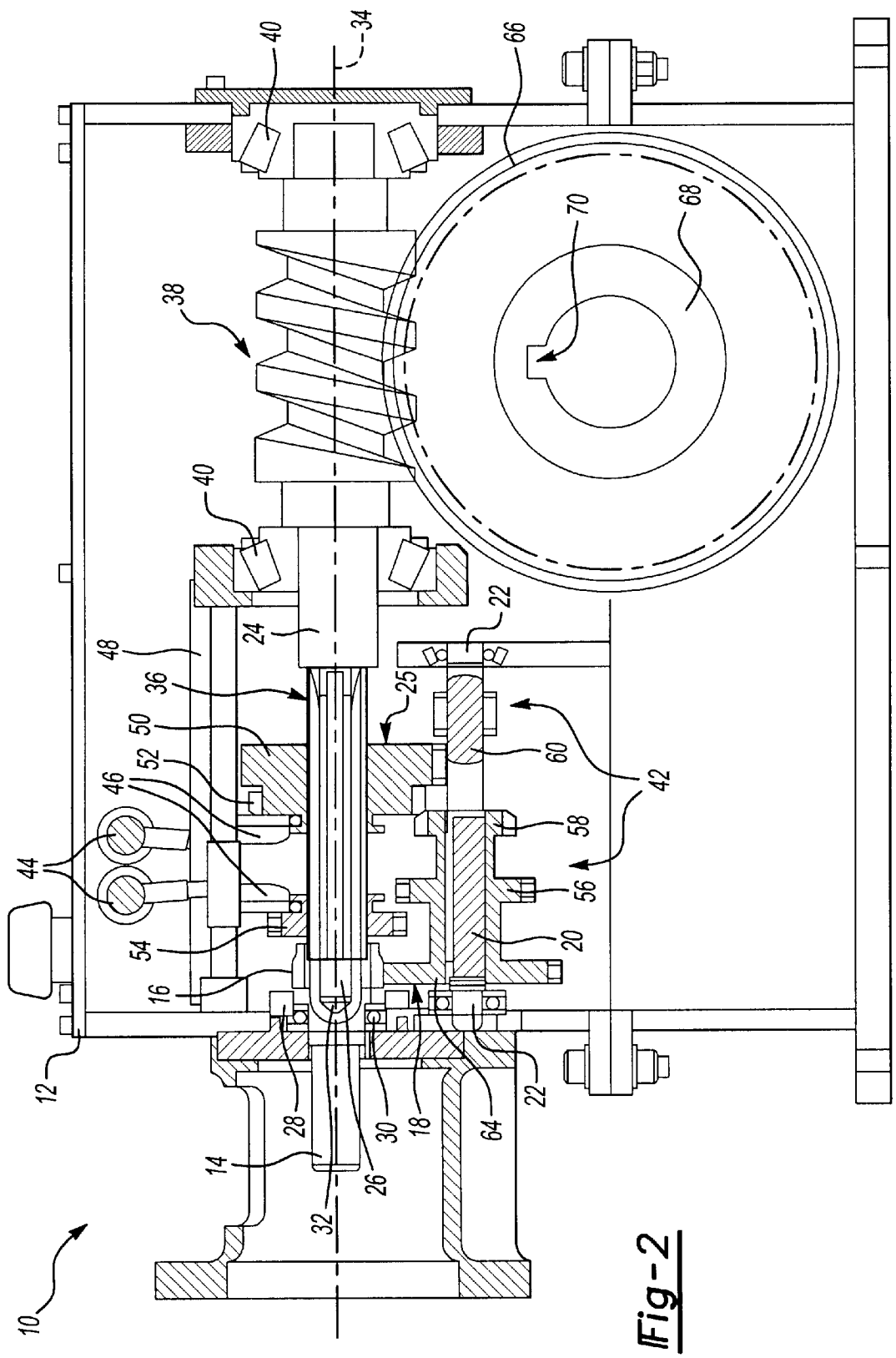
FIG. 2 is cross sectional view of a gearbox assembly.

Referring to FIG. 2, the assembly 10 includes a housing 12 supporting an input shaft 14 driven by an external power source such as the drive 11 shown in FIG. 1, at a first speed. The input shaft 14 includes a gear head 16 that is drivingly engaged to a shaft gear 18 on a first intermediate shaft 20. The first intermediate shaft 20 is mounted within the housing 12 parallel and below the input shaft 14. Bushings 22 rotatably support the first intermediate shaft 20 at opposite ends.

The first intermediate shaft 20 drives a second intermediate shaft 24 through at least two drive gears 42. Preferably, the input shaft 14 includes a cavity 26 having a thrust washer 28 and bearing assembly 30 to support an end 32 of the second intermediate shaft 24. The end 32 of the second intermediate shaft 24 supported within the cavity 26 is seperably rotatable along a common axis 34 with the input shaft 14.

The second intermediate shaft 24 includes a splined portion 36 and a worm shaft portion 38. The second intermediate shaft 24 is additionally supported by a pair of bearing assemblies 40 disposed on either side of the worm shaft portion 38. This is only one of many possible configurations of shaft mounting, and it should be understood that it is within the contemplation of this invention to configure the input and intermediate shafts in any manner known to a worker knowledgeable in the art.

The driven gears 25 of the second intermediate shaft 24 are selectively engageable to drive gears 42 of the first intermediate shaft 20 such that the speed of the second intermediate shaft 24 can be varied relative to the speed of the input shaft 20. The driven gears 25 are movable axially along the second intermediate shaft 24 and are selectively engaged by manipulation of at least one shift lever 44. Preferably, there are two shift levers 44 include a fork portion 46 in contact with the driven gears 25 disposed on the second intermediate shaft 24. The shift levers 44 themselves are mounted onto a shift bar 48 supported by the housing 12.

The driven gears 25 are mounted to allow axial movement along the splined portion 36 of the second intermediate shaft 24. Preferably the second intermediate shaft 24 includes first, second and third driven gears 50, 52, 54 that engage first, second and third drive gears 56, 58, 60 mounted on the first intermediate shaft 20. Preferably, the drive and driven gears 42, 25 are spur gears. The driven gears 25 are arranged such that the first and second gears 50, 52 compose an integral gear member 62. Further, the drive gears 42 are arranged such that the shaft gear 18 and the first and second drive gears 56, 58 compose a cluster spur gear 64.

The worm gear shaft portion 38 of the second intermediate shaft 24 drives a worm gear 66 on an output shaft 68. Preferably the output shaft 68 is transversely mounted to relative to the input shaft 14. The output shaft includes a keyway 70 for attachment to the mechanism to be driven by the gearbox assembly 10.

In operation, the input shaft 14 is driven by an external power source at a constant speed. The gear head 16 of the input shaft 14 drives the shaft gear 18 of the first intermediate shaft 20. The gear ratio between the gear head and the shaft gear are determined by specific application requirements and would be known to a worker skilled in the art. The first intermediate shaft 20 is therefore rotated at a constant speed based on the gear ratio between the gear head 16 and the shaft gear 18. One of the drive gears 42 is engaged to one of the driven gears 25 to rotate the second intermediate shaft 24. The shift levers 44 are manipulated to engage one of the driven gears 25 to a corresponding drive gear 42. The worm shaft portion 38 engages the worm gear 66 of the output shaft 68. The speed of the output shaft 68 is determined by the gear ratio between the drive gears 42 of the first intermediate shaft 20 and the driven gears 25 of the second intermediate shaft 24.

Figure 3:
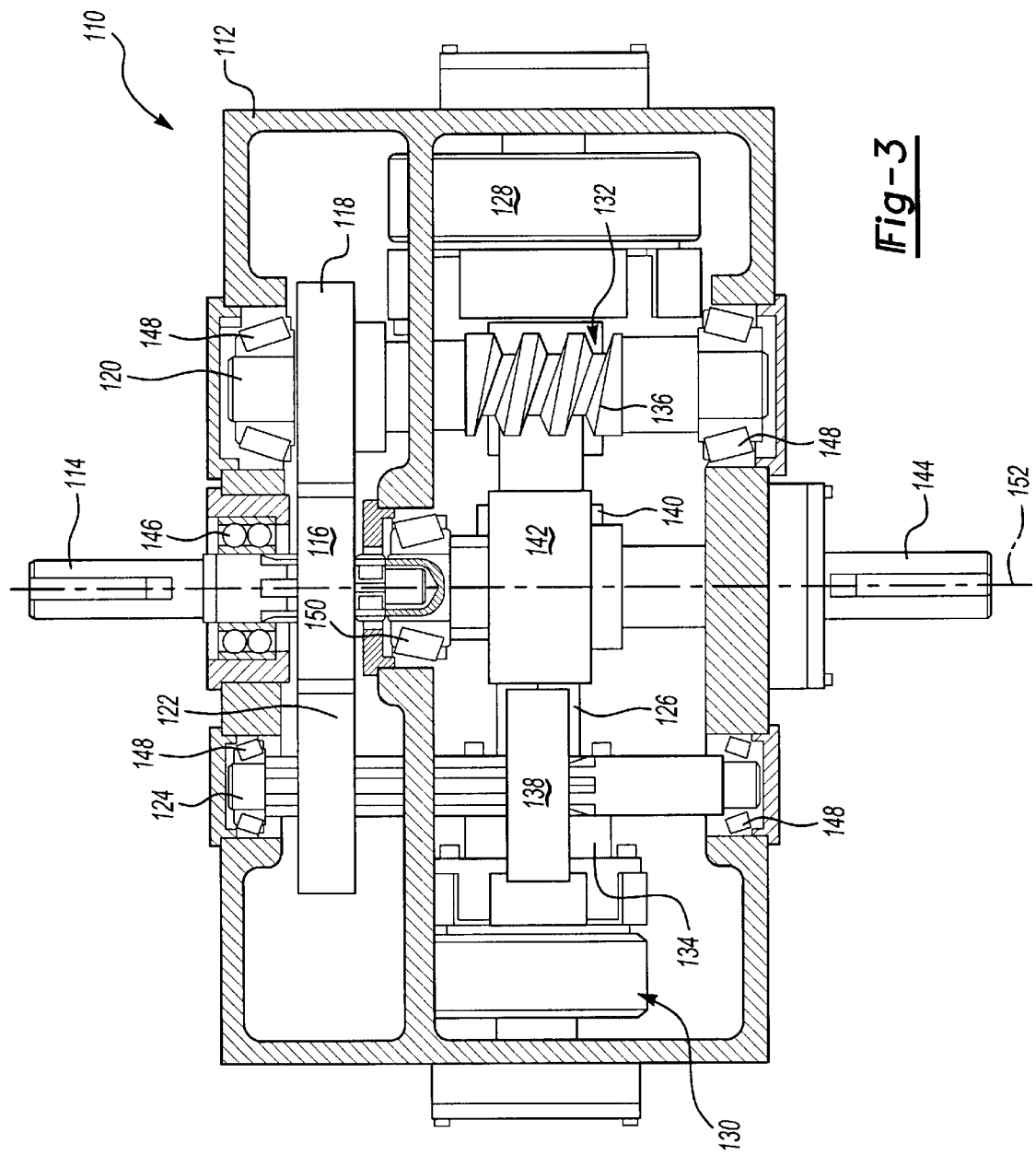
FIG. 3 is a cross sectional view of another embodiment of the gearbox assembly having clutches.

Referring to FIG. 3, another embodiment of the worm drive gearbox assembly is disclosed and is generally indicated at 110. An input shaft 114 supported by a housing 112 within a bearing assembly 146 drives first and second intermediate shafts 120, 124. The first and second intermediate shafts 120, 124, and the input shaft are supported parallel to one another by the housing 112 within bearing assemblies 148.

The input shaft 114 and first and second intermediate shafts 120, 124 include mating spur gears shown 116, 118, 122. The first spur gear 116 on the input shaft 114 drives second and third spur gears 118, 122 of the first and second intermediate shafts 120, 122. The input shaft 114 is driven by an external power source at a first speed. One skilled in the art would understand the rotational speed of the first and second intermediate shafts 118, 124 is determined by the specific gear ratio and is configured according to each application.

The first and second intermediate shafts 120, 124 include a drive gear 136, 138. Preferably, the drive gear 136 of the first intermediate shaft include is a worm shaft gear and the drive gear 138 of the second intermediate shaft is a helical gear. Although the preferred embodiment includes a worm shaft gear and a helical gear, any combination of gear known in the art are within the scope of this invention.

A third intermediate shaft 126 is disposed transverse to the first and second intermediate shafts 120, 124 and includes at least one clutch assembly. Preferably there are two clutch assemblies 128, 130 disposed at opposite ends of the third intermediate shaft 126. The specific type and configuration of the clutch assemblies 128, 130 can be of any type known in the art. Each clutch assembly 128, 130 includes a driven gear 132, 134 movable axially along the third intermediate shaft 126 such that the clutch assembly 128, 130 will move the driven gear 132, 134 into engagement with one of the first and second intermediate shafts 120, 124. Actuation of the clutch assemblies 128, 130 will move the driven gears axially 132, 134 into engagement with one of the drive gears 136, 138 disposed on the first and second intermediate shafts 120, 124.

Figure 4:
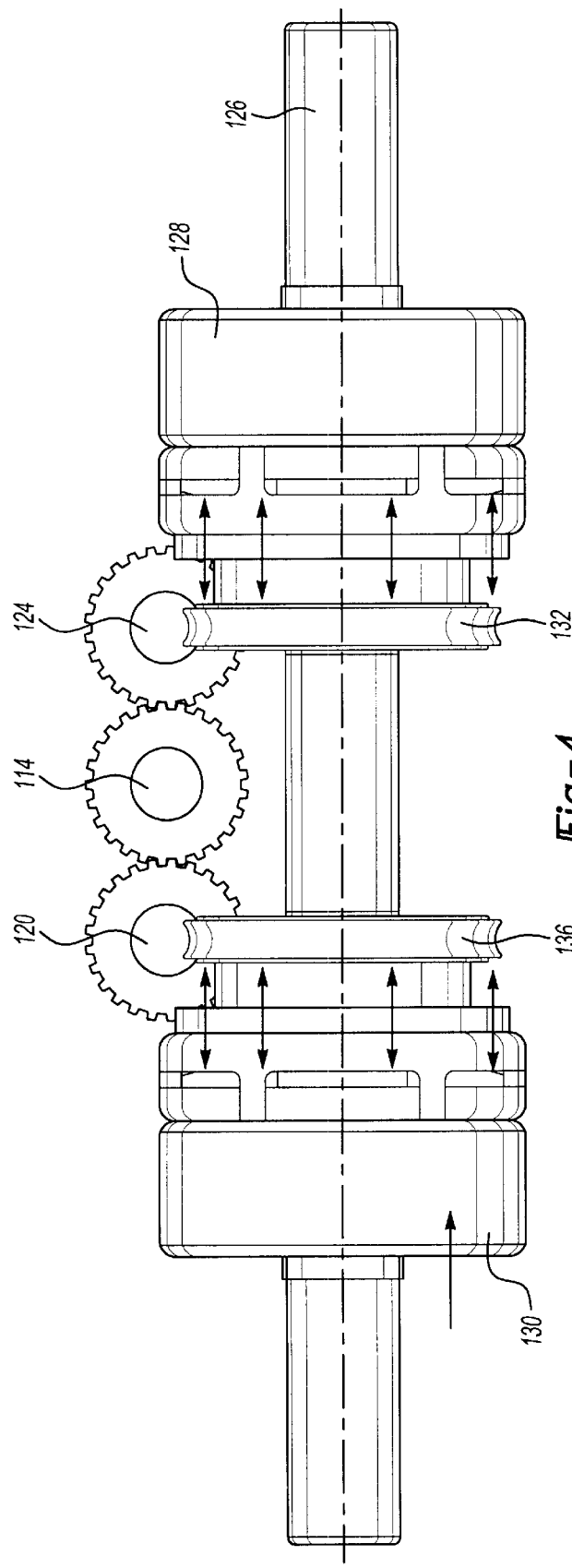
FIG. 4 is a front view of the third intermediate shaft including clutch assemblies.

Referring to FIG. 4, the clutch assemblies 128, 130 shift one of the first and second driven gears 132, 136 into engagement with one of the first and second drive gears 136, 138 of the first and second intermediate shafts 120, 124 to selectively vary the speed of the third intermediate shaft 126. The clutch assemblies 128, 130 are remotely actuated either electrically, pneumatically, or the like. The actuation of the clutch assemblies 128, 130 can be accomplished by any means known in the art.

One of the clutch assemblies 128, 130 are engaged to either of the first and second intermediate shafts 120, 124 at any specific time. The gear ration between the first driven gear 132 and the first drive gear 136 of the first intermediate shaft 120 is different from the gear ratio between the second driven gear 134 and the second drive gear 138 of the second intermediate shaft 124. The speed of the third intermediate shaft 136 depends on which of the two clutch assemblies 128, 130 are engaged.

Referring back to FIG. 3, the third shaft includes a final drive gear 140. Preferably the final drive gear is disposed at a central portion of the third intermediate shaft 126 for engagement to a final driven gear 142 of an output shaft 144. The output shaft 144 is driven at a second speed, different from the speed of the input shaft 114. The housing 112 includes a bearing assembly 150 that supports the output shaft 144. Preferably the output shaft 144 is parallel to the first and second intermediate shafts 120, 122. Further the output shaft 144 is disposed along a common axis 152 with the input shaft 114.

Figure 5:
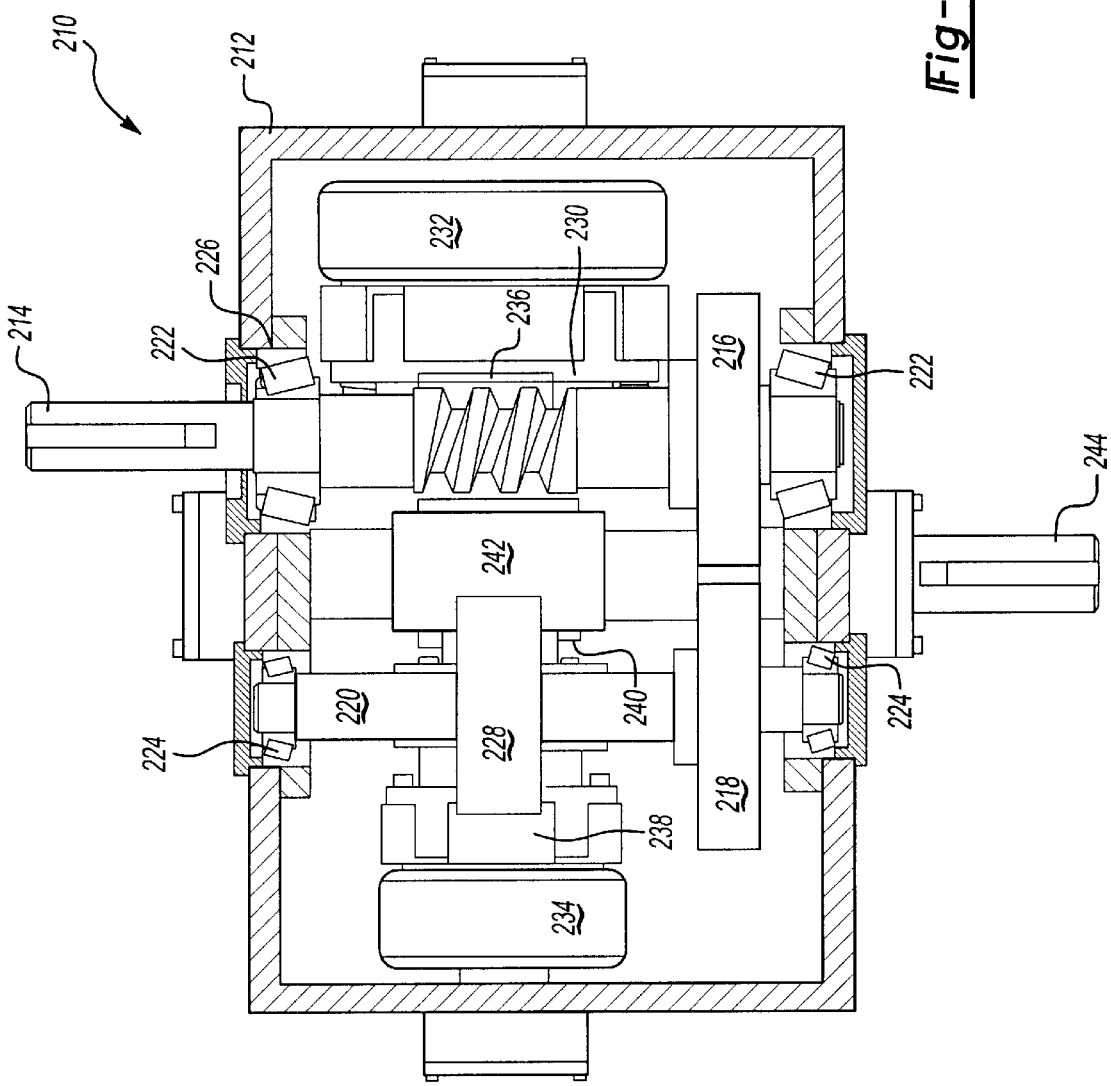
FIG. 5 is another embodiment of the gearbox assembly including clutch assemblies.

Referring to FIG. 5, another embodiment of the gearbox assembly is generally shown at 210 and includes a different shaft configuration from that shown in FIG. 2. In this embodiment the first intermediate shaft is combined with the input shaft such that a separate input shaft is not required. The housing 212 includes a bearing assembly 222 that supports the first shaft 214. The first shaft 214 includes a first spur gear 216 to drive a second spur gear 218 disposed on the second intermediate shaft 220. Bearing assemblies 224 support the second intermediate shaft within the housing 212. The first shaft 214 includes a worm shaft portion 226 that engages a worm gear portion 236 of a third intermediate shaft 230. The worm shaft portion 226 of the third intermediate shaft 230 is movable axially by a clutch assembly 232. The second intermediate shaft 220 includes a helical gear 228 that engages a helical gear 238 disposed on the third intermediate shaft 230. The helical gear 238 is movable axially upon the actuation of a second clutch assembly 234. The third shaft 230 includes a final drive gear 240 that that engages a final driven gear 242 of an output shaft 244. The output shaft 244 of this embodiment is disposed parallel to the first shaft 214 and the second intermediate shaft 220.

It should be understood that different shaft configurations are within the contemplation of this invention and that one skilled in the art would recognize possible modifications of this invention that would fall within the scope of this invention. As such the output shaft may be disposed transverse to the input shaft. The gearbox assembly may also include multiple output shafts that rotating and different speeds driven by a common input shaft.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A worm drive gearbox assembly comprising;

a housing;

an input shaft supported by said housing, and driven at a first speed;

a first intermediate shaft driven by said input shaft including a first drive gear;

a second intermediate shaft driven by said input shaft including a second drive gear;

a third intermediate shaft driven by one of said first or second intermediate shafts and including first and second driven gears and a final drive gear;

an output shaft including a final driven gear driven by said final drive gear of said third intermediate shaft at a second speed;

at least one clutch assembly disposed on said third intermediate shaft for shifting one of said first and second driven gears into engagement with one of said first and second drive gears to selectively vary said second speed of said output shaft; and wherein one of said intermediate shaft comprise a worm shaft portion.

2. The assembly of claim 1, wherein said first intermediate shaft is also said input shaft.

3. The assembly of claim 1, wherein said input shaft includes a first spur gear and said first and second intermediate shafts include second and third spur gears driven by said first spur gear.

4. The assembly of claim 1, wherein said first intermediate shaft includes a worm shaft portion and said second intermediate shaft includes a helical gear.

5. The assembly of claim 1, wherein said third intermediate shaft includes first and second clutch assemblies to selectively engage one of said first and second driven gears.

6. The assembly of claim 5, wherein said clutches are remotely actuated.

* * * * *

UNITED STATES PATENT AND TRADEMARK OFFICE
CERTIFICATE OF CORRECTION

PATENT NO. : 6,694,833 B2  Page 1 of 1
DATED : February 24, 2004
INVENTOR(S) : Hoehn et al.

It is certified that error appears in the above-identified patent and that said Letters Patent is hereby corrected as shown below:

<u>Column 6,</u>
Line 9, should read -- intermediate shafts comprise a worm shaft portion. --

Signed and Sealed this

Eighteenth Day of May, 2004

JON W. DUDAS
*Acting Director of the United States Patent and Trademark Office*